Patented Oct. 19, 1954

2,692,186

UNITED STATES PATENT OFFICE 2,692,186

MANUFACTURE OF SODIUM FLUORIDE LOW IN SILICA CONTENT

Jonas Kamlet, Easton, Conn.

No Drawing. Application June 25, 1953,
Serial No. 364,207

12 Claims. (Cl. 23—88)

This invention relates to a process for the manufacture of sodium fluoride low in silica content. More particularly, this invention relates to a cyclic process whereby sodium fluoride, low in silica content, may be manufactured from cheap and readily available raw materials.

As manufactured at the present time, technical sodium fluoride contains 94% to 97% NaF and 1.5% to 5.0% of sodium silicofluoride ($Na_2SiF_6$). The latter impurity makes the sodium fluoride unsuitable for use in the synthesis of cryolite. Cryolite is used in huge quantities as a component of the electrolytic bath in the Hall-Héroult aluminum process and may not contain more than 0.3% of $SiO_2$ if it is to be used for this purpose.

An excellent process for the manufacture of cryolite involves reacting a slurry of sodium fluoride with a slight excess of aluminum sulfate in the presence of a 1%–3% solution of sodium sulfate. Cryolite ($Na_3AlF_6$) precipitates in 97% yield, according to the equation:

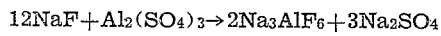

$$12NaF + Al_2(SO_4)_3 \rightarrow 2Na_3AlF_6 + 3Na_2SO_4$$

(Tishchenko, Ignatovich, and Krughjakov, Trans. State Inst. Applied Chem. USSR, #16, 70–80 (1932); Irie, Repts. Imp. Ind. Res. Inst. Osaka (Japan), 15 (7), 1–98 (1934); Fedotiev, Journ. Chem. Ind. USSR, 12, 265–8 (1935). This process is particularly attractive since it permits the use of aluminum sulfate instead of alumina in the manufacture of cryolite. Aluminum sulfate of very low silica content can be made by the sulfuric acid leaching of bauxite (including low grade ores not suitable for the Bayer alumina process), kaolins, clays and feldspars (Bureau of Mines Bulletin 267 (1927) and Report of Investigations 4191 (1948). The aluminum sulfate leachate can be easily freed of its content of dissolved iron, and represents an ideal raw material for conversion to cryolite by reaction with sodium fluoride.

Present methods for the manufacture of cryolite involve the use of aluminum oxide, aluminum hydroxide or sodium aluminate previously purified or freed of its silica content. It is the purpose of this invention to provide a process for the manufacture of sodium fluoride low in silica content so that it may be available for reaction with aluminum sulfate low in silica and iron content, to yield a cryolite which contains no more than the permissible amount of silica.

Since sodium aluminate, aluminum hydroxide and aluminum oxide, all low in silica content, are also used as raw materials in the electrolytic aluminum process, it is the further purpose of this invention to provide a process for the manufacture of sodium fluoride low in silica content so that cryolite might be manufactured therefrom without consuming any of these purified reagents, but using instead aluminum sulfate, low in silica content, made by an acid extraction. By providing an alternate, readily available raw material for cryolite manufacture, large amounts of electrolytic grade alumina will be freed for use elsewhere, e. g. in the manufacture of additional quantities of aluminum metal. Furthermore, aluminum sulfate can be manufactured from low grade bauxites, clays, kaolins and feldspars plentifully available in the United States. The process of this invention provides a method for the manufacture of sodium fluoride, low in silica content, from calcium fluoride-containing minerals (such as fluorspar) also plentifully available in the United States. Thus, cryolite, which is a strategically important mineral, can be synthesized from these two compounds prepared from domestically available raw materials. Alumina of electrolytic grade, however, is now prepared largely from high grade bauxites which are imported into the United States from abroad. Any process for the manufacture of cryolite based on the use of electrolytic grade alumina is therefore similarly dependent on foreign raw materials.

Sodium fluoride is now made almost exclusively by reacting fluorspar with sulfuric acid to obtain a solution of hydrofluoric acid, and neutralizing the resultant acid with caustic soda or soda ash. However, since the fluorspar almost invariably contains some silica, a secondary reaction occurs with the formation of fluosilicic acid.

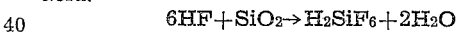

$$6HF + SiO_2 \rightarrow H_2SiF_6 + 2H_2O$$

On neutralization with alkali, sodium silicofluoride—$Na_2SiF_6$ forms and is precipitated with the poorly soluble sodium fluoride. Siegel (U. S. Patent 1,581,819 (1926)) attempts to remove the fluosilicic acid from solution as the difficulty soluble potassium salt. However, this procedure ultimately yields a sodium fluoride too high in potassium content to be suitable for use in the synthesis of cryolite.

In order to obtain a hydrofluoric acid low in silica content, it is often necessary to use a so-called "acid grade" of fluorspar, which is freed of a major portion of its silica content by a complex process of washing, tabling, flotation and other beneficiation operations. In spite of these operations, even acid-grade fluorspar is often found to give a hydrofluoric acid which is too high in silica content to be used in the manufacture of cryolite.

It is a further purpose of this invention to provide a process for the manufacture of sodium fluoride low in silica content which does not require acid grade fluorspar as a raw material but which can be made from lower or inferior grades of fluorspar. Even the so-called metallurgical grade of fluorspar (59%-65% $CaF_2$) and the grades containing considerable amounts of silica can be used as raw materials in the process of this invention.

In the treatment of phosphate rock or fluorapatite ($3Ca_3(PO_4)_2 \cdot CaF_2$) with sulfuric acid in the so-called "wet process" for the manufacture of phosphoric acid, or in the process for the manufacture of superphosphate fertilizer, a quantity of hydrogen fluoride, contaminated with silicon fluoride, is evolved. These evolved gases may be dissolved in water to yield an aqueous hydrofluoric acid containing varying amounts of fluosilicic acid —$H_2SiF_6$. Such a by-product may also be obtained in the difluorination of phosphate rock by calcining with silica (Whitney and Hollingsworth; Ind. and Eng. Chem. 41, 1325-1327 (1949); Hignett and Siegel, "Recovery of Fluorine in a Dry, Limestone-Packed Tower" (Tennessee Valley Authority); Atwell, Ind. Eng. Chem. 41, 1318-1324 (1949)).

It is the further purpose of this invention to provide a process whereby the hydrofluoric acids, contaminated with varying amounts of fluosilicic acid (whether derived by the reaction of low grade fluorspars with sulfuric acid, or as by-products in the treatment of phosphate rock with sulfuric acid, or as by-products in the difluorination of phosphate rock by calcining with silica, or by any means whatever); may be converted to sodium fluoride low in silica content.

The starting material for the process of this invention is a solution of fluoboric acid low in silica content. Fluoboric acid may be derived by the reaction of boric acid or boric anhydride or a borate salt with hydrogen fluoride;

$$H_3BO_3 + 4HF \rightarrow HBF_4 + 3H_2O$$
$$B_2O_3 + 8HF \rightarrow 2HBF_4 + 3H_2O$$
$$NaBO_2 + 5HF \rightarrow HBF_4 + NaF + 2H_2O$$
$$Na_2B_4O_7 + 18HF \rightarrow 4HBF_4 + 2NaF + 7H_2O$$

As early as 1864, F. Stolba showed that if the hydrofluoric acid used in this reaction contained any fluosilicic acid, the reaction with the boric acid will decompose the fluosilicic acid with the formation of fluoboric acid and the precipitation of the silica in a gelatinous form $$2H_2SiF_6 + 2H_3BO_3 \rightarrow 3HBF_4 + 2SiO_2 + 5H_2O$$

(Stolba, Zeit. Anal. Chem. 3, 312 (1864).)

Thus, a fluoboric acid solution low in silica content may be obtained according to the teachings of Stolba by reacting an aqueous solution of hydrofluoric acid contaminated with fluosilicic acid with a member of the group consisting of boric anhydride, boric acid and borate salts, providing that at least one mole of free boric acid equivalent be available for every four moles of free HF equivalent, and thereafter filtering off the solution of fluoboric acid from the gelatinous precipitate of silica.

I have found that this teaching of Stolba may be further modified and adapted to a cyclic process for the manufacture of sodium fluoride low in silica content by absorbing the gaseous hydrogen fluoride contaminated with silicon fluoride (obtained by any of the methods described above) in a recycled solution containing sufficient free boric acid to provide at least one mole of free boric acid equivalent for every four moles of fluoride equivalent whether present as hydrogen fluoride, silicon fluoride or fluosilicic acid. The reactions involved are:

$$4HF + H_3BO_3 \rightarrow HBF_4 + 3H_2O$$
$$SiF_4 + H_3BO_3 \rightarrow HBF_4 + SiO_2 + H_2O$$
$$2H_2SiF_6 + 3H_3BO_3 \rightarrow 3HBF_4 + 2SiO_2 + 5H_2O$$

The precipitated silica is filtered from the solution of fluoboric acid.

Subsequently, H. W. Heiser has shown that it is feasible to combine the formation of HF solution (from fluorspar and $H_2SO_4$), the reaction of HF with boric acid or a borate to form fluoboric acid, and the removal of silica from the fluoboric acid solution in a single step by the combined reaction of fluorspar, sulfuric acid and boric acid or a borate salt; (Heiser, U. S. Patent 2,182,511 of 1939).

For the purposes of my invention, fluoboric acid solutions low in silica content, made by either of these three methods, are equally suitable, i. e.:

(a) By the teachings of Stolba, by reacting a solution of HF containing $H_2SiF_6$ with boric acid, and filtering $SiO_2$ from the solution of $HBF_4$;

(b) By the teachings of Heiser, by digesting a mixture of fluorspar, sulfuric acid and boric acid solution, and filtering insoluble $CaSO_4$ and $SiO_2$ from the solution of $HBF_4$; or (c) By the method described above, by absorbing HF gas containing minor amounts of $SiF_4$ in a solution of boric acid or a borate, and filtering off the $SiO_2$ precipitate from the solution of $HBF_4$.

The basis of this invention is the finding that sodium fluoride, low in silica content, may be derived by the reaction of an aqueous solution of fluoboric acid, low in silica content (made by any of the methods described above) with a member of the group consisting of sodium hydroxide, sodium carbonate and sodium bicarbonate, providing that at least four mole-equivalents of the sodium compound is present for each mole-equivalent of fluoboric acid. The reaction involved may be described by the equations:

$$4NaOH + HBF_4 \rightarrow 4NaF + H_3BO_3 + H_2O$$
$$4NaHCO_3 + HBF_4 \rightarrow 4NaF + 4CO_2 + H_3BO_3 + H_2O$$
$$2Na_2CO_3 + HBF_4 \rightarrow 4NaF + 2CO_2 + HBO_2$$

Previous workers have shown that fluoboric acid will react with sodium carbonate or sodium hydroxide to form the poorly soluble sodium fluoborate ($NaBF_4$) (Berzelius, Ann. Physik. Chem. 78, 113-50 (1824), Pogg. Ann. 2, 113-50 (1824), Ann. Phil. (2) 10, 116 (1825); Stockholm Acad. Handl. 284-350 (1823) and 46-98, 278-328 (1824); De Boer, Verslag. Akad. Wetenschappen Amsterdam 36, 161-5 (1927); Kern and Jones, Trans. Amer. Electrochem. Soc. 57, 273-8 (1933); Meyerhofer, British Patent 222,838 (1923) and French Patent 579,039 (1924); Wilke-Dorfurt and Balz, Zeit. Anorg. Allgem. Chem. 159, 197-225 (1927).)

It was therefore unexpected to find that an excess of sodium hydroxide, carbonate or bicarbonate would cause the reaction to proceed in an entirely different direction, i. e. to the complete disassociation of the fluoborate ion and the formation of sodium fluoride and free boric acid.

If more than four mole-equivalents of the sodium alkali is used per mole of fluoboric acid, the reaction proceeds with the formation of sodium fluoride and a sodium borate, e. g.:

5NaOH+HBF₄→4NaF+NaBO₂+3H₂O
18NaOH+4HBF₄→16NaF+Na₂B₄O₇+11H₂O

The sodium fluoride, low in silica content, is poorly soluble even in hot water, whereas the boric acid or sodium borates formed are readily soluble in hot water. Thus, it suffices to separate the precipitated sodium fluoride by filtration and to return the filtrate to the process.

The filtrate (containing the boric acid or sodium borate and some unprecipitated NaF) may be returned to the process, thus making it cyclic. Thus:

(a) The filtrate may be fortified with sulfuric acid and thereafter used to react with ground fluorspar, to make a fluoboric acid solution low in silica content, according to the teachings of Heiser, or (b) The filtrate may be used to absorb HF gases which may contain some SiF₄, to make a fluoboric acid solution low in silica content, according to the novel procedure previously described, or (c) The filtrate may be concentrated or dried to a solid residue, and the said concentrate or residue containing boric acid or a sodium borate may be added to a solution of HF containing H₂SiF₆ to obtain a solution of fluoboric acid low in silica content, according to the teachings of Stolba.

The reaction of the fluoboric acid solution with the sodium alkali may be effected at any temperature between the freezing and boiling points of the reaction mixture. However, I prefer to react the fluoboric acid solution with the sodium alkali at temperatures between 70° C. and 100° C. to obtain a satisfactory reaction velocity. The reaction time may vary from several minutes to several hours. The reaction temperatures and reaction times in the process of this invention may vary over wide ranges and are by no means critical. In the cyclic process described herewith, the boric acid used is never consumed but is continuously recycled. Except for minor quantities of boric acid added periodically to make up for mechanical losses, the process once started does not require any reagents other than those used at present in the processes for the manufacture of sodium fluoride described in the prior art.

The following examples are given to define and to illustrate this invention, but in no ways to limit it to reagents, proportions and conditions described therein. Obvious modifications will occur to any person skilled in the art. The fluorspar used in these examples assays 80% calcium fluoride, 12% silica and 3% calcium carbonate.

*Example I employing the Heiser method for making the intermediate fluoboric acid*

314.0 gms. of fluorspar, ground to a fineness corresponding to 100 mesh, is added in small portions to a solution of 327.0 gms. of 66° Bé. sulfuric acid and 112.0 gms. of boric acid in one liter of water, with good stirring, at a temperature maintained at 90°–100° C., and the reaction mixture is stirred at 90°–100° C. for 2 hours, and is then filtered. The filter cake is washed with small amounts of hot water, and the filtrate and washings are combined. In this step, the fluorspar is used in slight stoichiometric excess and a fluoride recovery of 94% is obtained. The digestion at 90°–100° C. for two hours causes some concentration of the reaction mixture, which is thereafter compensated by the dilution of the filtrate by the addition of the wash waters.

The filtrate will assay about 132.0 gms. of fluoboric acid (1.5 moles) per liter. To this filtrate add in small portions 240 gms. of caustic soda (6.0 moles) per liter. Heat the reaction mixture at 90°–100° C. with stirring, for an hour, then filter off the copious precipitate of sodium fluoride. The filtrate will contain about 40 gms. of sodium fluoride and 112 gms. of boric acid per liter. This is fortified with 327.0 gms. of 66° Bé. sulfuric acid and is used to extract the next batch of 314.0 gms. of fluorspar, as described above, thus making the process cyclic. The losses of boric acid will be found to be about 7.6 gms. per kilogram of sodium fluoride obtained.

After recycling the first filtrate, the yields of sodium fluoride will be 236–245 grams per cycle. The sodium fluoride thus obtained contains less than 0.03% silica.

*Example II employing the Stolba method for making the intermediate fluoboric acid*

314.0 gms. of fluorspar, ground to a fineness corresponding to 100 mesh, is added in small portions to a solution of 327.0 gms. of 66° Bé. sulfuric acid in one liter of water, with good stirring, at a temperature maintained at 90°–100° C., and the reaction mixture is stirred at 90°–100° C. for 24 hours and is then filtered. The filter cake is washed with small quantities of hot water and the filtrate and washings are combined. To the combined liquors (which comprise a solution of HF and H₂SiF₆) is added 112.0 gms. of boric acid and the well-stirred reaction mixture is then further stirred for one hour at 90°–100° C. The reaction mixture is then filtered from the precipitate of silica which has formed.

The filtrate assaying about 132.0 gms. of fluoboric acid (1.5 moles) per liter, substantially free of silica. To this filtrate add in small portions 318.0 gms. of soda ash (3.0 moles). After the effervescence has largely subsided, digest the reaction mixture by heating at 90°–100° C. with stirring for two hours. The copious precipitate of sodium fluoride is filtered off, and the filtrate is concentrated or evaporated to dryness. The dry residue will contain about 45 gms. of sodium fluoride and 112.0 gms. of boric acid. This dry residue is added to the next batch of HF solution contaminated with H₂SiF₆ prepared as above described, thus making the process cyclic.

The yields of sodium fluoride will be 232–240 grams per cycle. The sodium fluoride thus obtained contains less than 0.02% silica.

*Example III employing the novel method described in this specification for making the intermediate fluoboric acid*

Hydrogen fluoride gas is generated by the reaction of fluorspar with concentrated sulfuric acid, or by the digestion of fluorapatite (phosphate rock) with sulfuric acid, or during the defluorination of phosphate rock by calcining with silica. A typical gas generated by one of these methods comprises as active ingredients 96% HF and 4% SiF₄.

Such a gas containing HF and some SiF₄ is absorbed at room temperature or below in a solution of 112.0 gms. of boric acid in one liter of water until a weight increase of 122.0 gms. per liter has occurred. The solution is then heated at 90°–100° C. for an hour, and is then filtered from the precipitate of silica which forms.

The filtrate contains 132.0 gms. of fluoboric acid (1.5 moles) per liter. To this filtrate add in small portions 240 gms. of caustic soda (6.0 moles) per liter. Heat the reaction mixture, with stirring, for an hour at 90°–100° C., then filter off the copious precipate of sodium fluoride. The filtrate will contain about 45 gms. of sodium fluoride and 112 gms. of boric acid per liter. This filtrate is used to absorb the next batch of HF, as described above, thus making the process cyclic.

After recycling the first filtrate, the yields of sodium fluoride will be 228–240 grams per cycle. The sodium fluoride thus obtained contains less than 0.03% silica.

Example IV.—Manufacture of cryolite 211 kgs. of bauxite ore (assaying 55.5% $Al_2O_3$) is ground to a fineness corresponding to 80% passing a 200 mesh screen, and is charged into an open lead-lined reactor. 292 kgs. of 66° Bé. sulfuric acid is added to 67 kgs. of water, and the diluted acid is added to the bauxite. The reaction mixture is agitated and, after the initial reaction has subsided, the reaction mixture is maintained at 105°–110° C. by introduction of live steam. After a reaction period of 15 to 20 hours, the solution of the alumina in the bauxite is substantially complete. The reaction mixture is treated with 4.1 kgs. of barium sulfide (black ash) (to reduce the ferric salts in the solution to the ferrous state and to precipitate the latter as FeS) and 0.13 kg. of flake glue (to coagulate and to precipitate finely divided suspended material. The reaction mixture is filtered and the insoluble residue on the filter press is washed several times with cold water. The filtrate is combined with the washings and diluted to a total volume of 1436 liters containing 359 kgs. of $Al_2(SO_4)_3$, i. e. a 25% solution.

To this batch of 1436 liters of 25% $Al_2(SO_4)_3$ solution (1.05 kg. moles) is added 70 kgs. of salt cake and 5 kgs. of 66 Bé. sulfuric acid, followed by a slurry of 504 kgs. of sodium fluoride (12 moles) in 1000 liters of water. The reaction mixture is heated, with good agitation, at 95°–100° C. for 4 to 5 hours, and the copious precipitate of sodium aluminum fluoride (cryolite) is filtered off. The filter cake is washed with small quantities of cold water. The filtrate and washings are combined and are concentrated and calcined to yield a by-product of salt cake.

The yield of cryolite ($Na_3AlF_6$) thus obtained is 407.5 kgs. or 97% of the theoretical. This cryolite, after drying at 500° C. for thirty minutes, assays 99.70% $Na_3AlF_6$ 0.03% $SiO_2$
0.05% $Fe_2O_3$
0.20% water The addition of small amounts of free sulfuric acid to the reaction mixture above serves to keep traces of iron salts which may be contained in the alum from precipitating with th cryolite. The cryolite thus obtained lends itself readily to the preparation of briquettes for shipping and charging to the electrolytic aluminum cells.

In addition to the cryolite, a by-product of 415–425 kgs. of salt cake is obtained (after deducting the 70 kgs. of salt cake recycled to the next batch of reaction mixture).

Having described my invention, what I claim and desire to protect by Letters Patent is:

1. A process for the manufacture of sodium fluoride low in silica content which comprises reacting an aqueous solution of fluoboric acid low in silica content with a member of the group consisting of sodium hydroxide, sodium carbonate and sodium bicarbonate, employing at least four mole-equivalents of the sodium compound for each mole of fluoboric acid, and separating the insoluble precipitate of sodium fluoride thus formed from the concomitant solution of at least one member of the group consisting of boric acid and the sodium borates.

2. A process for the manufacture of sodium fluoride low in silica content which comprises reacting an aqueous solution of fluoboric acid low in silica content with a member of the group consisting of sodium hydroxide, sodium carbonate and sodium bicarbonate, employing at least four mole-equivalents of the sodium compound for each mole of fluoboric acid at a temperature between 70° C. and 100° C., and separating the insoluble precipitate of sodium fluoride thus formed from the concomitant solution of at least one member of the group consisting of boric acid and the sodium borates.

3. A cyclic process for the manufacture of sodium fluoride low in silica content which comprises the steps of: (a) digesting a calcium fluoride-containing material with an aqueous solution of sulfuric acid and a member of the group consisting of boric acid and the sodium borates, and separating the aqueous solution of fluoboric acid low in silica content from the insoluble residue, and (b) reacting the solution of fluoboric acid with a member of the group consisting of sodium hydroxide, sodium carbonate and sodium bicarbonate, employing at least four mole-equivalents of the sodium compound for each mole of fluoboric acid, and separating the insoluble precipitate of sodium fluoride from the concomitant solution of at least one member of the group consisting of boric acid and the sodium borates, and (c) returning said solution of at least one member of the group consisting of boric acid and the sodium borates to be fortified with sulfuric acid and used in step (a) of the process.

4. The process of claim 3 where the calcium fluoride-containing material is fluorspar.

5. The process of claim 3 where the fluoboric acid is reacted with the sodium compound at temperatures between 70° C. and 100° C.

6. A cyclic process for the manufacture of sodium fluoride low in silica content which comprises the steps of: (a) digesting a calcium fluoride-containing material with an aqueous solution of sulfuric acid and separating the aqueous solutions of hydrogen fluoride containing some fluosilicic acid from the insoluble residue, and (b) reacting said hydrogen fluoride solution with a member of the group consisting of boric acid and the sodium borates, and filtering off the precipitated silica from the resultant solution of fluoboric acid low in silica content, and (c) reacting the solution of fluoboric acid with a member of the group consisting of sodium hydroxide, sodium carbonate and sodium bicarbonate, employing at least four mole-equivalents of the sodium compound for each mole of fluoboric acid, and separating the insoluble precipitate of sodium fluoride from the concomitant solution of at least one member of the group consisting of boric acid and the sodium borates, and (d) recovering said at least one member of the group consisting of boric acid and the sodium borates and returning the same for use in step (b) of the process.

7. The process of claim 6 where the calcium fluoride-containing material is fluorspar.

8. The process of claim 6 where the fluoboric acid is reacted with the sodium compound at temperatures between 70° C. and 100° C.

9. A cyclic process for the manufacture of sodium fluoride low in silica content which comprises the steps of: (a) absorbing hydrogen fluoride gas containing some silicon tetrafluoride in an aqueous solution of boric acid until at most four moles of equivalent HF have been absorbed per mole of boric acid, and separating the precipitated silica from the resultant solution of fluoboric acid low in silica content, and (b) reacting the solution of fluoboric acid with a member of the group consisting of sodium hydroxide, sodium carbonate and sodium bicarbonate, employing at least four mole-equivalents of the sodium compound for each mole of fluoboric acid, and separating the insoluble precipitate of sodium fluoride from the concomitant solution of boric acid, and (c) returning said solution of boric acid to step (a) of the process to absorb a further quantity of hydrogen fluoride gas.

10. The process of claim 9 where the hydrogen fluoride gas is derived by the reaction of a member of the group consisting of fluorspar and fluorapatite with sulfuric acid.

11. The process of claim 9 where the hydrogen fluoride is derived during the defluorination of fluorapatite by calcination with silica.

12. The process of claim 9 where the fluoboric acid is reacted with the sodium compound at temperatures between 70° C. and 100° C.

References Cited in the file of this patent

UNITED STATES PATENTS

| Number | Name | Date |
|---|---|---|
| 1,324,030 | Bowman | Dec. 9, 1919 |
| 2,182,509 | Heiser | Dec. 5, 1939 |

OTHER REFERENCES

"Baker Analyzed" Reagents, spec. Catalog, July 1951, page 202, J. T. Baker Chemical Co., Phillipsburg, N. J.